(12) United States Patent
Petre et al.

(10) Patent No.: US 12,204,490 B2
(45) Date of Patent: *Jan. 21, 2025

(54) PIPELINED COGNITIVE SIGNAL PROCESSOR

(71) Applicant: The Boeing Company, Chicago, IL (US)

(72) Inventors: Peter Petre, Oak Park, CA (US); Shankar Rao, Agoura Hills, CA (US); Gabriel Virbila, Venice, CA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,262

(22) Filed: Nov. 30, 2022

(65) Prior Publication Data

US 2023/0109019 A1   Apr. 6, 2023

Related U.S. Application Data

(63) Continuation of application No. 16/046,499, filed on Jul. 26, 2018, now Pat. No. 11,531,639.

(51) Int. Cl.
*H04L 27/14* (2006.01)
*G06F 1/10* (2006.01)
(Continued)

(52) U.S. Cl.
CPC ............ *G06F 15/7878* (2013.01); *G06F 1/10* (2013.01); *G06N 3/08* (2013.01)

(58) Field of Classification Search
CPC ......... G06F 15/7878; G06F 1/10; G06N 3/08; G05B 17/02; H04L 1/0071; H03K 19/1776
(Continued)

(56) References Cited

U.S. PATENT DOCUMENTS 5,694,474 A    12/1997 Ngo et al.
6,980,028 B1 *  12/2005 Plants ................ H03K 19/1776
                                                  326/40
(Continued)

OTHER PUBLICATIONS

Jaeger et al., "Harnessing nonlinbearity: Predicting chaotic systems and saving energy in wireless communications," Science, vol. 304, No. 5667, pp. 78-80, 2004.
(Continued)

*Primary Examiner* — Phuong Phu
(74) *Attorney, Agent, or Firm* — MH2 Technology Law Group LLP

(57) ABSTRACT

Techniques for denoising an electromagnetic signal are disclosed. The techniques utilize an antenna, a weight adaptation component, a reservoir computer including a computer interpretable neural network, a delay embedding component, and an output layer computer. The techniques include passively acquiring an electromagnetic signal by the antenna, producing a plurality of reservoir state values by the reservoir computer based on the electromagnetic signal, collecting the plurality of reservoir state values by the delay embedding component into a historical record, determining a plurality of reservoir state value weights by the weight adaptation component based at least in part of the historical record, scaling, by the plurality of reservoir state value weights, to produce a plurality of output values, the plurality of reservoir state values by the output layer computer, and outputting the plurality of output values, where the scaling occurs over a plurality of clock cycles of a clock for the system.

20 Claims, 5 Drawing Sheets

(51) Int. Cl.
  *G06F 15/78* (2006.01)
  *G06N 3/08* (2023.01)
  *H04L 27/16* (2006.01)
  *H04L 27/22* (2006.01)

(58) Field of Classification Search
  USPC .................. 375/324, 340, 219, 295, 316
  See application file for complete search history.

(56) References Cited

U.S. PATENT DOCUMENTS

| | | | |
|---|---|---|---|
| 8,031,117 B2 | 10/2011 | Goldberg | |
| 9,042,496 B1 | 5/2015 | Su | |
| 9,054,782 B2 | 5/2015 | Hunter | |
| 9,659,120 B2 | 5/2017 | Fehri | |
| 11,531,639 B2* | 12/2022 | Petre | G06F 1/10 |
| 2005/0267377 A1 | 12/2005 | Marossero et al. | |
| 2007/0237260 A1 | 10/2007 | Hori | |
| 2009/0054999 A1* | 2/2009 | Batruni | G05B 17/02 |
| | | | 703/2 |
| 2012/0076234 A1* | 3/2012 | Kim | H04L 1/0071 |
| | | | 375/295 |
| 2012/0086504 A1 | 4/2012 | Tsukamoto | |
| 2012/0232418 A1 | 9/2012 | Kimura et al. | |
| 2013/0304395 A1 | 11/2013 | Naidu et al. | |
| 2016/0191020 A1 | 6/2016 | Velazquez | |
| 2016/0203827 A1 | 7/2016 | Leff et al. | |
| 2016/0317096 A1 | 11/2016 | Adams | |
| 2019/0253204 A1* | 8/2019 | Takeda | H04L 1/1861 |

OTHER PUBLICATIONS

Legenstein et al., "Edge of chaos and prediction of computational performance for neural microcircuit models," Neural Networks 20 (3), pp. 323-334, 2007.

Maass, Liquid Computing, Proc. of the Conference CiE'07: Computability in Europe 2007, Siena (Italy), pp. 507-516.

Takens, "Detecting Strange Attractors in Turbulence," Dynamical Systems and Turbulence, Lecture Notes in Mathematics vol. 898, 1981, pp. 366-381.

Verstraeten et al., "An experimental unification of reservoir computing methods," Neural Networks, vol. 20, No. 3, Apr. 2007, pp. 391-403.

Walden, "Analog-to-digital converter survey and analysis," IEEE J. Sel. Areas Commun., vol. 51, pp. 539-548, 1999.

Yap et al., "A First analysis of the stability of Takens' Embedding," in Proc. of the IEEE Global Conference on Signal and Information Processing (GlobalSIP) symposium on Information Processing for Big Data, Dec. 2014, pp. 404-408.

Choi et al., "Blind source separation and independent component analysis: A Review," Neural Information Processing—Letters, vol. 6, No. 1, Jan. 2005, pp. 1-57.

Cichocki et al., "Source separawtion of temporally correlated sources from noisy data using a bank of band-pass filters," in Proc. of Independent Component Analysis and Signal Separation (ICA-2001), pp. 173-178, San Diego, USA, Dec. 9-13, 2001.

Hyvarinen, "Complexity Pursuit: Separating interesting components from time series," Neural Computation vol. 13, No. 4, pp. 883-898, Apr. 2001.

Igel et al., "Improving the Rprop learning algorithm," in Proc. of the 2nd Int. Symposium on Neural Computation (NC 2000), pp. 115-121, ICSC Academic Press, 2000.

* cited by examiner

PIPELINED COGNITIVE SIGNAL PROCESSOR

CROSS-REFERENCE TO RELATED APPLICATIONS

This application is a continuation of U.S. patent application Ser. No. 16/046,499, filed Jul. 26, 2018, the entire contents of which are incorporated herein by reference.

FIELD

This disclosure relates generally to denoising electromagnetic signals, more particularly, to denoising signals that contain a mixture of waveforms over an ultra-wide bandwidth.

BACKGROUND

State-of-the-art systems for detecting, localizing, and classifying source emitters using passive radio frequency antennas over an ultra-wide bandwidth (>30 Gigahertz (Ghz)) signal generally requires high rate analog-to-digital converters. Such high-rate ADCs are expensive and power hungry; due to fundamental physical limits (such as the Walden curve), they are not capable of achieving the sampling rate needed to capture the ultra-wide bandwidth. To mitigate this, state-of-the-art Electronic Support Measure (ESM) systems use either spectrum sweeping (which is too slow to handle agile emitters) or a suite of digital channelizers, which have large size, weight, and power requirements. In addition, the detection, localization, and classification algorithms used in state-of-the-art ESM systems are typically based on the fast Fourier transform, with high computational complexity and memory requirements that make it difficult to operate in real-time over an ultra-wide bandwidth.

Conventional methods for denoising fall into two categories: filter-based methods and training-based approaches. Filter-based methods use filtering to smooth out noise from a signal, but are too simplistic to simultaneously maintain the low-frequency long-term trends of a signal while adapting to the high-frequency abrupt transitions. Training-based methods rely on a "dictionary" that models the signals of interest. Such a dictionary must be trained in an offline process, and requires training data that may not be available. In addition, the dictionary often requires a large amount of memory and computation to be stored and leveraged on the platform, making such approaches infeasible for ultra-low Size, Weight, and Power (SWaP) systems.

Thus, a continuing need exists for a signal denoising system that does not require offline training and can efficiently operate over a wide bandwidth.

SUMMARY

According to various embodiments, a denoising cognitive signal processor system is disclosed. The system includes an antenna communicatively coupled to a reservoir computer and to a weight adaptation component, the antenna configured to passively acquire an electromagnetic signal; a reservoir computer including a computer interpretable neural network, where an output of the reservoir computer is communicatively coupled to an input of the reservoir computer and to a delay embedding component, where the reservoir computer is configured to produce a plurality of reservoir state values; a delay embedding component including an input communicatively coupled to an output of the reservoir computer and an output communicatively coupled to an input of a weight adaptation component and to an input of an output layer computer, where the delay embedding computer is configured to collect the plurality of reservoir state values; a weight adaptation component including an output communicatively coupled to an input of the weight adaptation component and to an input of an output layer computer, where the weight adaptation component is configured to determine a plurality of reservoir state value weights; and an output layer computer including an input communicatively coupled to an output of the delay embedding component, an input communicatively coupled to an output of the weight adaptation component, and an output communicatively coupled to an input to the weight adaptation component, where the output layer component is configured to scale the plurality of reservoir state values by the plurality of reservoir state value weights to produce a plurality of outputs; where the output layer computer is configured to scale the plurality of reservoir state values by the plurality of reservoir state value weights over a plurality of clock cycles of a clock for the system.

Various optional features of the above embodiments include the following. The reservoir computer, the delay embedding component, the weight adaptation component, and the output layer computer may be implemented in at least one Field Programmable gate Array (FPGA). The reservoir computer, the delay embedding component, the weight adaptation component, and the output layer computer may be implemented in at least one Complementary Metal Oxide Semiconductor (CMOS). The reservoir computer may include an electronic memory for storing a reservoir connectivity matrix that models feedback connections between nodes of the neural network. The reservoir computer may include an electronic memory for storing feed forward connections from inputs to a plurality of reservoir states. The output layer computer may be configured to store intermediate values while it scales the plurality of reservoir state values by the plurality of reservoir state value weights over a plurality of clock cycles of a clock for the system. The output layer computer may be configured to scale the plurality of reservoir state values by the plurality of reservoir state value weights using a cascade of elementary functions. Each output may be produced within $N_{\tau mul} + \log_4 N + \log_4 K$ clock cycles, where $N_{\tau mul}$ is a number of clock cycles used for elementwise pipeline multiplication, N is a size of the reservoir computer, and K is a delay embedding factor. The weight adaptation component may be configured to determine the plurality of reservoir state value weights over a plurality of clock cycles of a clock for the system. The system may include only a single antenna.

According to various embodiments, a method of denoising an electromagnetic signal by a cognitive signal processor system is disclosed. The system includes an antenna communicatively coupled to a reservoir computer and to a weight adaptation component, a reservoir computer including a computer interpretable neural network, where an output of the reservoir computer is communicatively coupled to an input of the reservoir computer and to a delay embedding component, a delay embedding component including an input communicatively coupled to an output of the reservoir computer and an output communicatively coupled to an input of a weight adaptation component and to an input of an output layer computer, a weight adaptation component including an output communicatively coupled to an input of the weight adaptation component and to an input of an output layer computer, and an output layer computer including an input communicatively coupled to an output of the delay embedding component, an input communicatively coupled to an output of the weight adaptation component, and an output communicatively coupled to an input to the weight adaptation component. The method includes: passively acquiring an electromagnetic signal by the antenna; producing a plurality of reservoir state values by the reservoir computer based on the electromagnetic signal; collecting the plurality of reservoir state values by the delay embedding component into a historical record; determining a plurality of reservoir state value weights by the weight adaptation component based at least in part of the historical record; scaling, by the plurality of reservoir state value weights, to produce a plurality of output values, the plurality of reservoir state values by the output layer computer; and outputting the plurality of output values; where the scaling occurs over a plurality of clock cycles of a clock for the system.

Various optional features of the above embodiments include the following. The reservoir computer, the delay embedding component, the weight adaptation component, and the output layer computer may be implemented in at least one Field Programmable gate Array (FPGA). The reservoir computer, the delay embedding component, the weight adaptation component, and the output layer computer may be implemented in at least one Complementary Metal Oxide Semiconductor (CMOS). The producing a plurality of reservoir state values may be performed using an electronically stored reservoir connectivity matrix that models feedback connections between nodes of the neural network. The producing a plurality of reservoir state values may be performed using electronically stored feed forward connections from inputs to a plurality of reservoir states. The scaling may include storing intermediate values while the output layer computer scales the plurality of reservoir state values by the plurality of reservoir state value weights over a plurality of clock cycles of a clock for the system. The scaling may include using a cascade of elementary functions. Each output may be produced within $N_{\tau mul}+\log_4 N+\log_4 K$ clock cycles, where $N_{\tau mul}$ is a number of clock cycles used for elementwise pipeline multiplication, N is a size of the reservoir computer, and K is a delay embedding factor. The determining a plurality of reservoir state value weights may occur over a plurality of clock cycles of a clock for the system. The system may include only a single antenna.

BRIEF DESCRIPTION OF THE DRAWINGS

Various features of the examples can be more fully appreciated, as the examples become better understood with reference to the following detailed description, when considered in connection with the accompanying figures, in which.

DESCRIPTION

Figure 1:
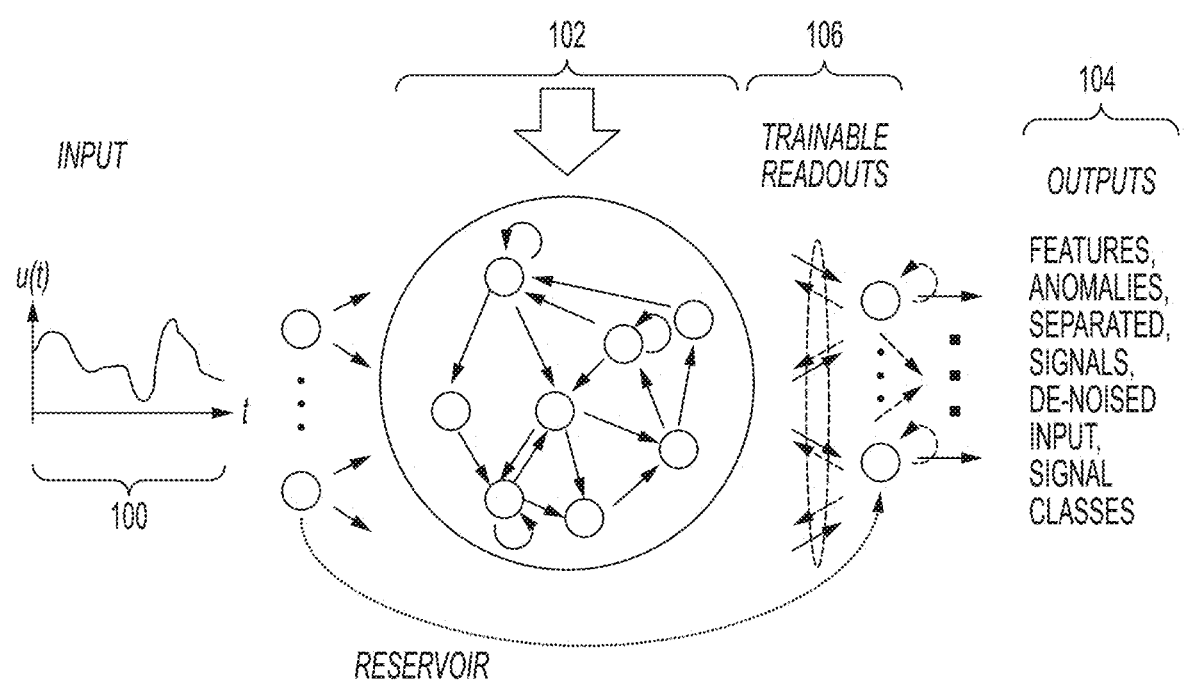
FIG. 1 is a schematic diagram of a reservoir computer according to various examples.

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Examples of the present invention relate to a system for signal denoising and, more particularly, to a cognitive signal processor for denoising a signal that contains a mixture of waveforms over an ultra-wide bandwidth. Briefly stated, the system includes three primary components (and several additional components). The first component is a reservoir computer, which supports the cognitive-inspired aspect of examples. The dynamic reservoir computer maps an input signal to a high-dimensional dynamical system known as the reservoir. The reservoir connectivity weights are optimized for the task of signal denoising. Signal denoising occurs when reconstructing the input signal at the output using the output weights and delay embedding component. The second component is a delay embedding component that creates a finite temporal record of the values of the reservoir states. The third component is a weight adaptation component that adapts the output of the reservoir via gradient descent to produce a prediction of the input signal a small time step in the future. Because the noise in the input signal is inherently random and unpredictable, the predicted input signal will be free of noise. The error between the predicted input signal and actual input is used by the weight adaptation component to further tune the output weights of the reservoir in an iterative process. The three primary components and the additional components, as well as their individual and collective operation, is described in detail herein.

Examples described herein exhibit at least eight advantages in challenging denoising scenarios relative to current state-of-the-art methods. First, because examples perform adaptive filtering, their hardware-based nature requires much less weight and power than current brute-force channelization methods. Second, examples can cover an ultra-wide bandwidth, and yet still exhibit very low latencies. Third, examples can perform this denoising operation using only a single input antenna. Fourth, examples are capable of denoising signals in real-time using a constraint that covers a wide range of electromagnetic and acoustic signals of interest. Many other current approaches use powerful, but computationally expensive constraints, such as signal complexity measures, or rely on loose constraints, such as filter banks, which may be less computationally expensive but have limited capacity to capture the structure of real-world source signals. In contrast, some examples utilize the constraint that the waveforms of interest in a source signal can be linearly predicted over a short interval of time, which can be computed quickly with limited computational cost. Fifth, in the deterministically designed reservoir of some examples, the reservoir states each correspond to the amount of input signal energy near a particular frequency. This enables such examples to generate a real-time spectrogram of a complex input signal that can be implemented efficiently in hardware. Sixth, some examples perform certain calculations, such as matrix additions and multiplications, over multiple clock cycles, storing intermediate results. Such examples achieve this advantage by using pipelined computations, such that each major computation is processed as a cascade of elementary functions. Seventh, some examples have increased throughput, that is, the rate of digitized data, in comparison to prior techniques. These and other advantages are described in detail herein.

FIG. 1 is a schematic diagram of a reservoir computer according to various examples. As shown, a reservoir computer maps an input signal vector 100 to a high-dimensional state-space 102 that models the underlying time-varying dynamics of the signal general process. The reservoir states from the state-space 102 can be mapped to useful outputs 104, including denoised outputs, signal classes, separated signals, and anomalies using adaptable linear readout layers 106.

Figure 2:
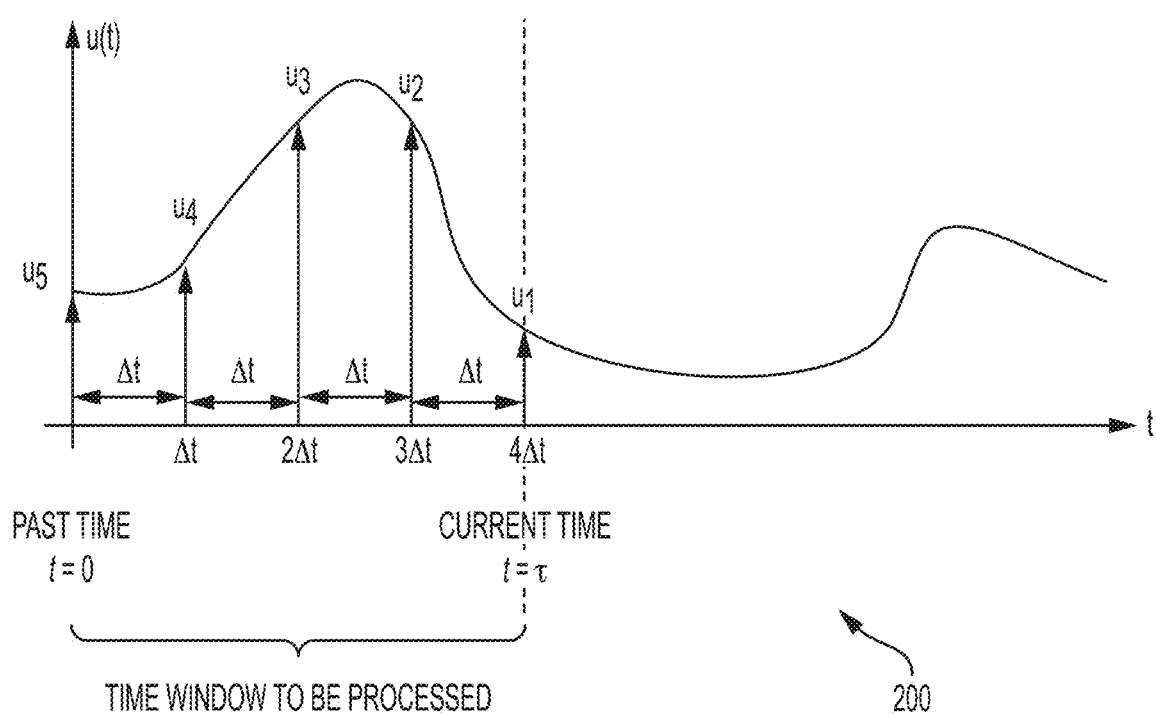
FIG. 2 is a chart illustrating a uniformly sampled u(t) with sampling period Δt.

FIG. 2 is a chart 200 illustrating a uniformly sampled u(t) with sampling period Δt. This shows the input signal u(t) over the interval [t−τ,t] partitioned into intervals of width Δt. Because entire continuous interval might not be available in software or digital hardware, in some examples, u(t) is approximated over the interval using linear basis functions. Given the sampling period Δt, u(t), a set of samples $$u_i \stackrel{def}{=} u(t - (i-1)\Delta t), 1 \le i \le n_e + 1$$

are collected, where $$n_e = \frac{\tau}{\Delta t}$$

in the number of sampling intervals within the time window defined by τ

Figure 3:
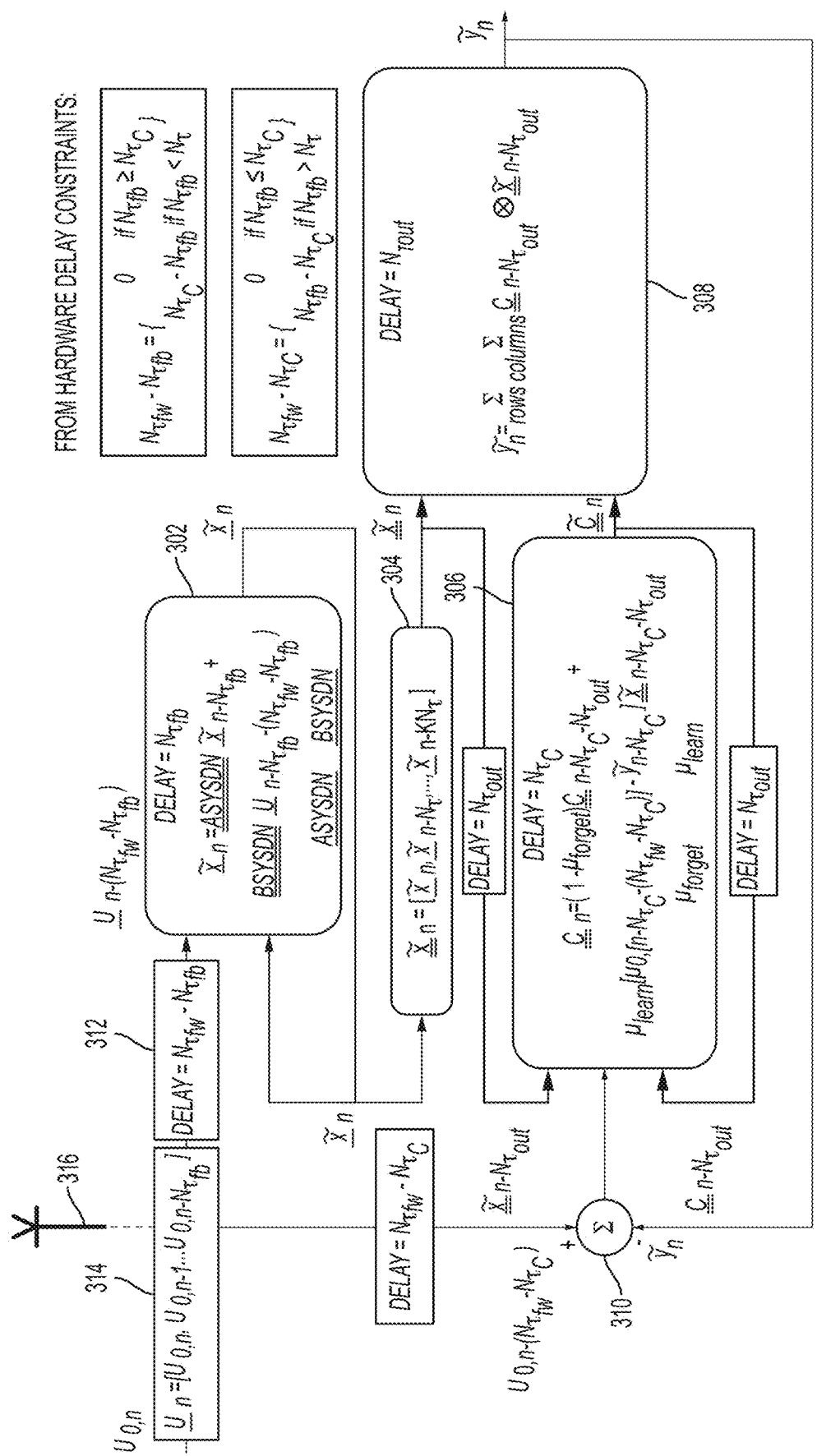
FIG. 3 is a schematic diagram of a pipelined cognitive signal processor for denoising wide bandwidth signals.

FIG. 3 is a schematic diagram of a pipelined cognitive signal processor 300 for denoising wide bandwidth signals. Cognitive signal processor 300 may be implemented as described presently. Cognitive signal processor 300 may perform a denoising method such as method 400 as shown and described below in reference to FIG. 4.

Cognitive signal processor 300 includes reservoir computer 302, which is the brain-inspired aspect of the signal denoising system. In general, a "reservoir computer" is a special form of a recurrent neural network (a neural network with feedback connections) that operates by projecting the input signal vector into a high-dimensional reservoir state space, which contains an equivalent dynamical model of the signal generation process capturing all of the available and actionable information about the input. The reservoir has readout layers that can be adapted, either off-line or on-line, to learn desired outputs by utilizing the state functions. Thus, a reservoir computer has the power of recurrent neural networks to model non-stationary (time-varying) processes and phenomena, but with simple readout layers and adaptation algorithms that are both accurate and efficient.

As implemented in cognitive signal processor 300, reservoir computer 302 accepts a mixture of wide-bandwidth signals $$\underline{u}_n = [u_{0,n}, u_{0,n-1}, \ldots, u_{0,n-N_{\tau_{fb}}}]$$

acquired by antenna 316 and pre-processed into digital data as input, where each $u_{i,j}$ represents measured values, and maps it to its high-dimensional dynamical reservoir. (Note regarding notation: as used herein, single underline terms, e.g., $\underline{z}$, represent vectors, and double underlined terms, e.g., $\underline{\underline{Z}}$, represent matrices.) Reservoir computer 302 has a predefined number of outputs, which are generated by continually mapping the reservoir states through a set of distinct linear functions with one such function defined per output. Further, reservoir computer 302 utilizes a block diagonal structure for its reservoir connectivity matrix denoted $\overline{\overline{ASYSDN}}$, which models feedback connections between nodes. The block diagonal structure facilitates a number of multiplications that scale linearly with the number of reservoir nodes, and is thus far more efficient to implement in low Size, Weight and power (SWaP) hardware than similar signal denoising systems. Reservoir computer 302 further uses feed forward connection matrix denoted $\overline{\overline{BSYSDN}}$, which models feed forward connections from the inputs to the reservoir states. Reservoir computer 302 outputs the current states of its reservoir at time n, denoted $\underline{\tilde{x}}_n$, both to delay embedding component 304 and as feedback data to itself. Thus, the current states output by reservoir computer 302 are functions of its past states. Note that processing by reservoir computer takes $N_{\tau_{fb}}$ to complete for each iteration.

Cognitive signal processor 300 also includes delay embedding component 304. The reservoir states $\underline{\tilde{x}}_n$ at time n from reservoir computer 302 are continuously passed through delay embedding component, which creates a finite temporal record $\overline{\overline{\tilde{x}}}_n$ of the values of the reservoir state, K+1 such states, with a delay of τ between them. Thus, delay embedding component 304 includes a volatile memory device, e.g., Random Access Memory (RAM), that holds states $\underline{\tilde{x}}_n$ and concatenates them into $\overline{\overline{X}}_n$. Each time a new $\underline{\tilde{x}}_n$ is received from reservoir computer 302, it is added to the matrix $\overline{\overline{X}}_n$. Because the memory device is finite, once it reaches capacity, it drops the oldest $\underline{\tilde{X}}_n$. Thus, the memory device utilizes first-in-first-out (FIFO) functionality with respect to incoming $\underline{\tilde{x}}_n$. Delay embedding component passes at least a portion of the historical records or reservoir states, $$\underline{\tilde{X}}_{n-N_{\tau_{out}}},$$

to weight adaptation component 306 and to output layer computer 308.

Cognitive signal processor 300 also includes weight adaptation component 306 that adapts the output of reservoir computer 302 via gradient descent to produce a prediction of the input signal a small time step in the future. Noise is by definition random and therefore unpredictable, so the predicted input signal will be free of noise. The error between the predicted input signal and actual input is used by weight adaptation component 306 to further tune the output weights of the reservoir in an iterative process, resulting in a clean or denoised output signal. Thus, weight adaptation component 306 receives as inputs the finite temporal record $\overline{\overline{X}}_n$ of the values of the reservoir states provided by delay embedding component, as well as a difference provided by comparator 310 between the input signal vector $\underline{u}_n$ provided to reservoir computer 302 and the ultimate output $\underline{y}_n$ by output layer computer 308. Weight adaptation component 306 utilizes gradient descent based on this difference to scale the reservoir state matrix $\overline{\overline{X}}_n$. Further, weight adaptation component 306 provides as an output a matrix of weights $\overline{\overline{C}}_n$ to output layer computer 308, and as feedback back to itself after being subjected to a delay of $N_{\tau_{out}}$. That is, weight adaptation component 306 provides weights $\overline{\overline{C}}_n$ that include the output layer, which are combined with the reservoir state matrix $\overline{\overline{X}}_n$ to obtain the final output $\tilde{y}_n$.

Cognitive signal processor 300 also include output layer computer 308, which applies the weights $\overline{C}_n$ determined by weight adaptation n component 306 to the reservoir states $\overline{\tilde{X}}_n$ determined by the reservoir computer. Output layer computer 308 provides a denoised signal $\tilde{y}_n$ as an output for usage by a user or a component of a different system, such as a targeting system. Output layer computer 308 also provides the denoised signal $\tilde{y}_n$ to comparator 310 for comparison to the input signal vector $\underline{u}_n$.

Note that cognitive signal processor 300 carefully tracks and account for delays produced by the various components and processing. For example, it imposes a delay 312 of $N_{\tau_{fw}} - N_{\tau_{fb}}$ to the input vector $\underline{u}_n$ prior to input to comparator 310. Thus, the data input to reservoir computer may be characterized as $$\underline{u}_{n-\left(N_{\tau_{fw}} - N_{\tau_{fb}}\right)}.$$

Further, processing by reservoir computer 302 introduces a delay of $N_{\tau_{fb}}$, processing by weight adaptation component 306 introduces a delay of $N_{\tau_C}$, and processing by output layer computer 308 introduces a delay of $N_{\tau_{out}}$. These are accounted for by introducing compensating delays elsewhere. For example, the feedback loop for weight adaptation component 306 includes a delay of $N_{\tau_{out}}$. User adjustable parameters include the input delay $N_{\tau_{fw}}$ and the prediction length, that is, how far ahead the prediction considers, $N_{\tau_{out}}$. As a result of the delay accounting and other advantages described herein, throughput of examples is typically at least an order of magnitude greater than from comparable techniques.

Cognitive signal processor 300 may be advantageously implemented in hardware or firmware, as opposed to software implementation. Advantages include high speed (relative to software implementations), low weight, and low power requirements. Hardware implementations include implementations on Complementary Metal Oxide Semiconductor (CMOS), for example. Firmware implementations include implementations on Field Programmable Gate Arrays (FPGA), for example. Other hardware and firmware implementations are possible.

In contrast to existing cognitive signal processing systems in which all values are required to be computed and updated within one clock cycle and therefore impose limitations on the maximum clock rate and/or size of the reservoir, examples of the present invention have no such restrictions. Examples that are able to perform computations over a plurality of clock cycles have many advantages over existing solutions. Stepping back, note that in any reasonable reduction to practice of a cognitive signal processor, a finite amount of time is required to compute and update values throughout the hardware. However, better denoising performance can be achieved by increasing the number of nodes, or equivalently increasing the size of reservoir connectivity matrix, but at the cost of requiring more time to compute values, where the number of required computations directly increase with the size of the reservoir. For example, in order to compute an output, the element wise multiplication of the output layer weights with the stored history of values of the reservoir state is summed across all the products. By doubling the size of the reservoir, the number of products that must be summed is doubled, which requires more time to compute the final value. Conversely, to process more instantaneous bandwidth, the clock rate must be increased to satisfy the Nyquist sampling criteria. But increasing the clock rate leaves less time for system values to be computed and updated. For systems that must perform computations within one clock cycle, the maximum clock rate is highly dependent on the size of the system, e.g., as measured by the number of layers in the reservoir or equivalently the number of columns in the connectivity matrix.

Examples compensate for these limitations by allowing and accounting for multiple clock cycles when computing various values throughout the system. Each major computation is broken down into a cascade of elementary functional computations over multiple clock cycles. In particular, the matrix multiplication and summing performed by output layer computer 308, the state $\tilde{x}_n$ update performed by reservoir computer 302, and the output layer weight $\overline{C}_n$ update performed by weight adaptation component 306 may each be performed over multiple clock cycles. Computing output $\tilde{y}_n$ may utilize $N_{\tau mul} + \log_4 N + \log_4 K$ clock cycles, where $N_{\tau mul}$ is a number of clock cycles used for elementwise pipeline multiplication, N is a size of the reservoir computer (or number of rows to be summed), and K is a delay embedding factor (or number of columns to be summed). The log 4 reflects a pipeline summing tree, where four intermediate values are summed and then stored, to be used as an input in the next elementary summing computation. The four intermediate values for the $\log_4$ summing tree correspond to values that are partial sums of the final summation from N inputs. For example, summing sixteen inputs using a $\log_4$ summing tree would require $\log_4 16 = 2$ clock cycles. In that case, the first partial sums would be represented as, for example:

sum$_1$=in$_1$+in$_2$+in$_3$+in$_4$, sum$_2$=in$_5$+in$_6$+in$_7$+in$_8$, sum$_3$=in$_9$+in$_{10}$+in$_{11}$+in$_{12}$, and sum$_4$=in$_{13}$+in$_{14}$+in$_{15}$+in$_{16}$, with the final sum being represented as, by way of non-limiting example, sum$_{out}$=sum$_1$+sum$_2$+sum$_3$+sum$_4$. The computation of sum$_{out}$ may occur over two clock cycles. The first clock cycle is to compute the intermediate values, sum$_1$, sum$_2$, sum$_3$ and sum$_4$, and the second clock cycle is to compute the final output sum$_{out}$. According to some examples, all summations occur over multiple clock cycles and have intermediate values if the number of inputs is greater than the summing base. In example described in this paragraph, the summing base is four. However, examples are not limited to a base of four, and the base may depend in part on the selection of hardware for implementation.

Figure 4:
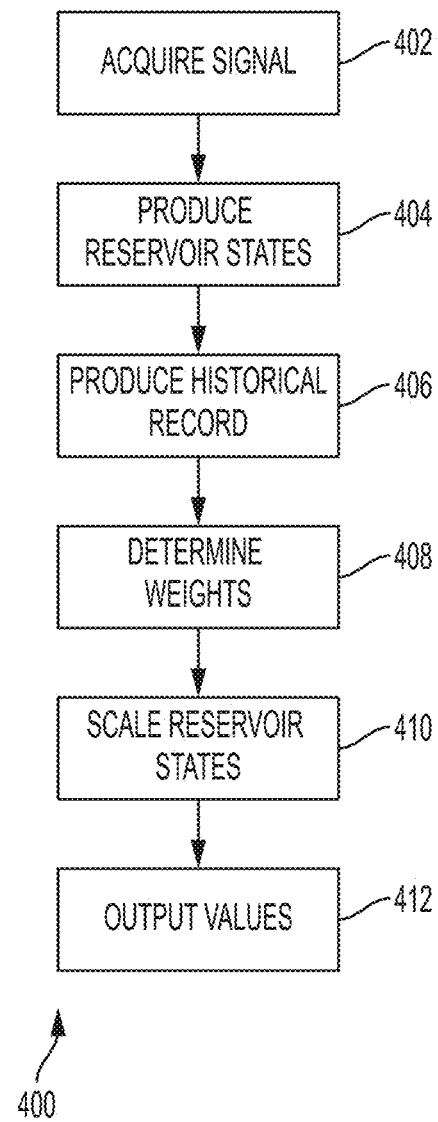
FIG. 4 is a flowchart illustrating a method for denoising wide bandwidth signals using pipelined cognitive signal processor according to various examples.

FIG. 4 is a flowchart illustrating a method 400 for denoising wide bandwidth signals using pipelined cognitive signal processor according to various examples. Method 400 may be implemented using cognitive signal processor 300 of FIG. 3.

At block 402, cognitive signal processor 300 acquires a signal using single antenna 316. The acquired signal may then be digitized before being passed to the next stage in the process. In contrast to prior techniques, a single passive antenna is sufficient for the disclosed examples.

At block 404, cognitive signal processor 300 produces reservoir states in the reservoir of reservoir computer 302. The states are based on the mixture of wide-bandwidth signals $$\mathcal{U}_n = [u_{0,n}, u_{0,n-1}, \ldots, u_{0,n-N_{T_{fb}}}]$$

314 provided to reservoir computer 302, as well as being based on feedback from the output of reservoir computer 302 itself.

At block 406, delay embedding component 304 produces a historical record of reservoir states $\overline{\overline{X}}_n$ based on the individual reservoir states $\underline{\tilde{x}}_n$ produced by reservoir computer 302.

At block 408, weight adaptation component 306 determines weights for the reservoir states as shown and described above in reference to FIG. 3.

At block 410, output layer computer 308 scales the reservoir states by the weights output from weight adaptation component 306 as shown and described above in reference to FIG. 3.

At block 412, system 300 outputs the denoised signal according to the weighted reservoir states as determined by output layer computer 308. The output may be made to any of a variety of systems and entities. According to some embodiments, the output is to a locating system, for example. Other uses for examples are described presently.

As can be appreciated by those skilled in the art, there are a number of applications in which examples can be implemented. For example, examples can be implemented in Electronic Support Measures (ESM) receivers and within any other system in which it may be desirable to perform real-time processing of signals over an ultra-wide bandwidth. Examples provide expanded situational awareness, providing the core functionality required for ultra-low latency signal detection and analysis over large instantaneous bandwidth to enable real-time resource allocation based on the particular radio frequency environment. Without implying a limitation, real-time resources includes further signal analysis assets and resources such as aircraft, drones, ships, and other vehicles, either collecting the noisy signals, or responding to the analysis of the denoised signals. This performance can be achieved on computing platforms with orders of magnitude lower size, weight, and power.

Examples are also applicable to vehicle applications, enabling cognitive radio in low signal-to-noise ratio conditions. Examples can also be used in vehicle manufacturing, helping to significantly denoise the control signal used for automated welding in the factory. The additional capability of examples to generate a real-time spectrogram will further facilitate situational awareness for airborne platforms and autonomous cars.

Examples are also applicable to vehicle (e.g., unmanned aerial vehicles—UAV, plane, car, boat, robot) or man-portable applications, such as rapid detection and separation of significant objects (e.g., obstacles, terrain, other vehicles, persons, animals) from clutter from radar antenna signals. As a non-limiting example, once the denoised waveform signal is generated, the sought-after or otherwise identified object can be located using imagery, triangulation or any other suitable technique, with assets then being deployed to the object's location. Such deployment can include causing an autonomous drone to physically maneuver above the object's location for observation purposes, etc.

As additional examples, in autonomous vehicle operation, cars or other vehicles may use radars to detect and avoid obstacles. Due to clutter, such as trees, other cars, and walls, the radar returns for obstacles may be weak relative to other returns within the spectrum and also be obscured by them. In one aspect, examples can be used to denoise radio frequency signals, such as those collected by radar receivers (e.g., antenna, sensors, etc.). Separation of significant object pulses from clutter pulses reduces the likelihood that the autonomous vehicle will be confused by clutter and can then effectively detect and avoid a significant object. For example, once a significant object is detected based on the denoised signal, an example can cause a vehicle to act (by being connected with an appropriate vehicle control system) based on the significant object, such as slowing, accelerating, stopping, turning, and/or otherwise maneuvering around the significant object. Other actions based on the obstacle are also possible, such as causing the vehicle to inform or warn a vehicle occupant and/or vehicle operator about the obstacle with an audible warning, a light, text, and/or an image, such as a radar display image. For further examples, the system may generate commands and control operations of vehicle systems that can be adjusted, such as vehicle suspension or safety systems such as airbags and seatbelts, etc. Yet another example application includes being used in vehicle manufacturing by helping to significantly denoise the control signal used for automated welding in the factory.

Figure 5:
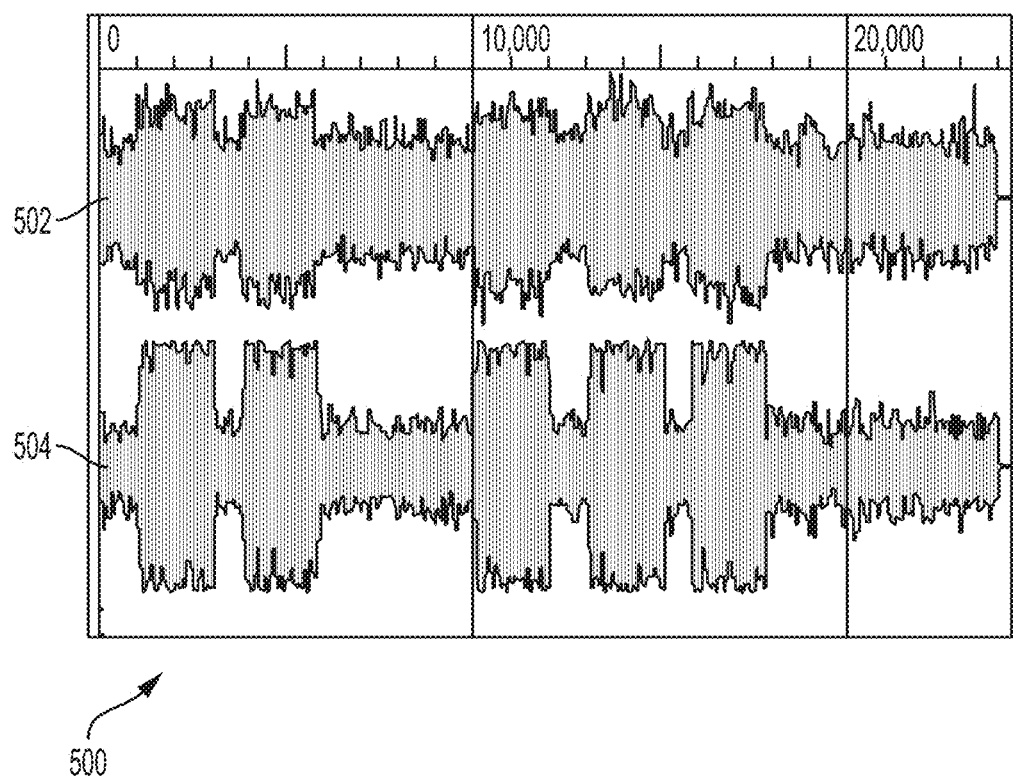
FIG. 5 is a partial screenshot of a before-and-after signal as processed according to an example.

FIG. 5 is a partial screenshot 500 of a before-and-after signal as processed according to an example. In particular, screenshot 500 illustrates unprocessed signal 502, which represents an unprocessed signal, and processed signal 504, which represents a signal processed by a reduction to practice of cognitive signal processor 300 as described presently. As shown, processed signal 504 is clearly less noisy in comparison to unprocessed signal 502.

The example reduction to practice was based on a XILINX VIRTEX ULTRASCALE+ VCU118 Evaluation Kit, which includes an FPGA. The FPGA offers a maximum clock rate of around 775 MHz and 6,840 digital signal processing (DSP) slices with an Fmax of 775 MHz when fully pipelined. In the test, the FPGA was clocked at 400 MHz. A predefined dataset consisting of synthetic data using five narrow pulses with added noise was stored locally in memory on the FPGA and used to validate the modified cognitive signal processor. The dataset was then sequentially clocked into the implemented cognitive signal processor, continuously looping when the end of the dataset was reached.

A 40-node design was constructed with the intention of verifying on the FPGA. For the input and output, 16-bits were used in the known data format of Q0.15. The states were 16-bits and of known data format Q1.14. The coefficients for system matrices and multiplier coefficients used to compute the next set of output layer weights were 24-bits of the known data format Q0.23. A delay embedding factor of 16 was used.

By implementing the cognitive signal processor architecture running with a clock rate of 400 MHz, the inventors were able to demonstrate a ten-times improvement with respect to throughput when compared with similar, but one-computation-per-clock-cycle architecture running at 40 MHz, which is near the maximal available clock speed for such systems.

Certain examples described above can be performed in part using a computer application or program. The computer program can exist in a variety of forms, both active and inactive. For example, the computer program can exist as one or more software programs, software modules, or both, that can be included of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A cognitive signal processor system for denoising an electromagnetic signal, the cognitive signal processing system comprising:
    a reservoir computer that receives an electromagnetic signal and produces reservoir state values, wherein the reservoir computer comprises a neural network, and wherein the electromagnetic signal comprises a mixture of waveforms over an ultra-wide bandwidth;
    a delay embedding component that creates a finite temporal record of the reservoir state values, the delay embedding component coupled to the reservoir computer; and
    a weight adaptation component that determines state value weights for the reservoir state values based at least in part on the finite temporal record, wherein the weight adaptation component uses an error between a predicted signal and the electromagnetic signal to tune output weights of the reservoir, the weight adaptation component coupled to the delay embedding component,
    wherein the cognitive signal processor system is configured to scale the reservoir state values by the state value weights for the reservoir state values to produce and output a plurality of outputs.

2. The cognitive signal processor system of claim 1, wherein the cognitive signal processor system is configured to scale the reservoir state values by the state value weights for the reservoir state values over a plurality of clock cycles of a clock for the cognitive signal processor system.

3. The cognitive signal processor system of claim 1, wherein the reservoir computer models feedback connections between nodes of the neural network.

4. The cognitive signal processor system of claim 1, wherein the reservoir state values are based on the mixture of waveforms of the electromagnetic signal received by the reservoir computer, and the reservoir computer maps the electromagnetic signal to a dynamical system.

5. The cognitive signal processor system of claim 1, wherein the reservoir computer comprises electronic memory for storing feed forward connections from inputs to a plurality of reservoir states.

6. The cognitive signal processor system of claim 1, wherein the reservoir computer, the delay embedding component, and the weight adaptation component are implemented one of: a Complementary Metal Oxide Semiconductor (CMOS), or a Field Programmable gate Array (FPGA).

7. The cognitive signal processor system of claim 1, wherein the weight adaptation component is configured to determine the reservoir state value weights over a plurality of clock cycles of a clock for the cognitive signal processor system.

8. The cognitive signal processor system of claim 1, wherein the cognitive signal processor system receives the electromagnetic signal from a single antenna.

9. A method of denoising an electromagnetic signal using a cognitive signal processor, the method comprising:
    producing, by a reservoir computer, reservoir state values based on an electromagnetic signal, wherein the reservoir computer comprises a neural network, and wherein the electromagnetic signal comprises a mixture of waveforms over an ultra-wide bandwidth;
    creating, by a delay embedding component coupled to the reservoir computer, a finite temporal record of the reservoir state values;
    determining, by a weight adaptation component coupled to the delay embedding component, state value weights for the reservoir state values based at least in part on the finite temporal record, wherein the weight adaptation component uses an error between a predicted signal and the electromagnetic signal to tune output weights of the reservoir;
    scaling the reservoir state values by the state value weights for the reservoir state values to produce a plurality of outputs; and
    outputting the plurality of output values.

10. The method of claim 9, wherein the scaling occurs over a plurality of clock cycles of a clock for the cognitive signal processor.

11. The method of claim 9, further comprising modeling, by the reservoir computer, feedback connections between nodes of the neural network.

12. The method of claim 9, wherein the reservoir state values are based on the mixture of waveforms of the electromagnetic signal received by the reservoir computer, and the reservoir computer maps the electromagnetic signal to a dynamical system.

13. The method of claim 9, further comprising storing, by the reservoir computer, feed forward connections from inputs to a plurality of reservoir states in electronic memory.

14. The method of claim 9, wherein the reservoir computer, the delay embedding component, and the weight adaptation component are implemented one of: a Complementary Metal Oxide Semiconductor (CMOS), or a Field Programmable gate Array (FPGA).

15. The method of claim 9, wherein the determining occurs over a plurality of clock cycles of a clock for the cognitive signal processor.

16. The method of claim 9, wherein the cognitive signal processor receives the electromagnetic signal from a single antenna.

17. A cognitive signal processor system for denoising an electromagnetic signal, the cognitive signal processing system comprising:
    a reservoir computer that receives an electromagnetic signal and produces reservoir state values, wherein the reservoir computer comprises a neural network, and wherein the electromagnetic signal comprises a mixture of waveforms over an ultra-wide bandwidth;
    a delay embedding component that creates a finite temporal record of the reservoir state values, the delay embedding component coupled to the reservoir computer; and a weight adaptation component that determines state value weights for the reservoir state values based at least in part on the finite temporal record, the weight adaptation component coupled to the delay embedding component, wherein the weight adaptation component adapts an output of the reservoir computer via gradient descent to produce a prediction of the electromagnetic signal, wherein the cognitive signal processor system is configured to scale the reservoir state values by the state value weights for the reservoir state values to produce and output a plurality of outputs.

18. The cognitive signal processor system of claim 17, wherein the reservoir computer models feedback connections between nodes of the neural network.

19. A method of denoising an electromagnetic signal using a cognitive signal processor, the method comprising:
  producing, by a reservoir computer, reservoir state values based on an electromagnetic signal, wherein the reservoir computer comprises a neural network, and wherein the electromagnetic signal comprises a mixture of waveforms over an ultra-wide bandwidth;
  creating, by a delay embedding component coupled to the reservoir computer, a finite temporal record of the reservoir state values;
  determining, by a weight adaptation component coupled to the delay embedding component, state value weights for the reservoir state values based at least in part on the finite temporal record, wherein the weight adaptation component adapts an output of the reservoir computer via gradient descent to produce a prediction of the electromagnetic signal;
  scaling the reservoir state values by the state value weights for the reservoir state values to produce a plurality of outputs; and
  outputting the plurality of output values.

20. The method of claim 19, further comprising modeling, by the reservoir computer, feedback connections between nodes of the neural network.

\* \* \* \* \*